J. F. BRENNAN.
BRAKE TESTER.
APPLICATION FILED APR. 24, 1916.
1,264,770.
Patented Apr. 30, 1918.
2 SHEETS—SHEET 2.
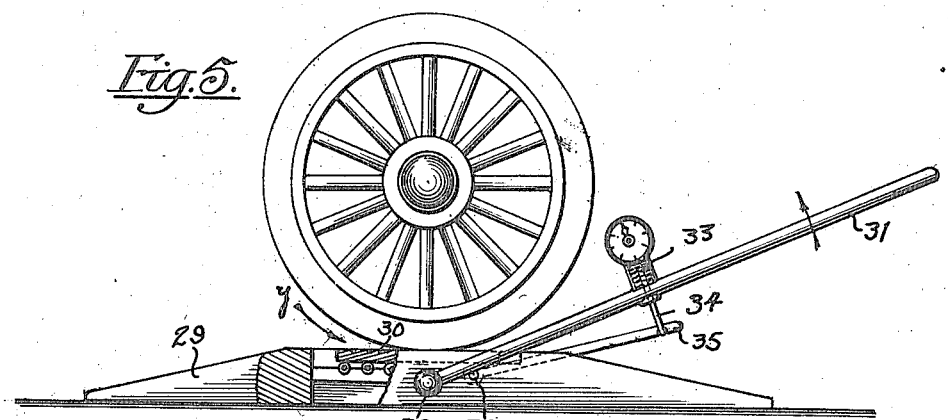
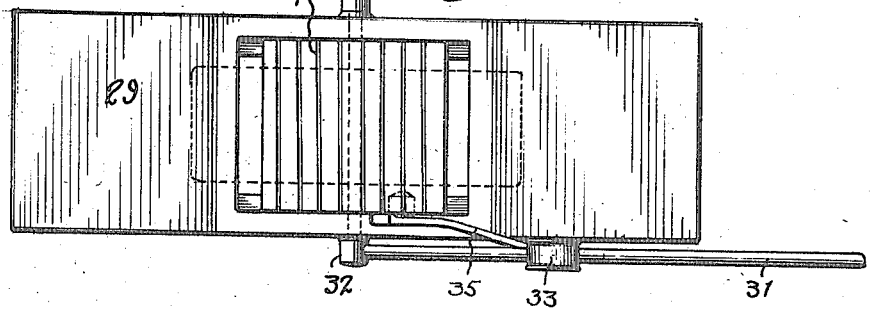
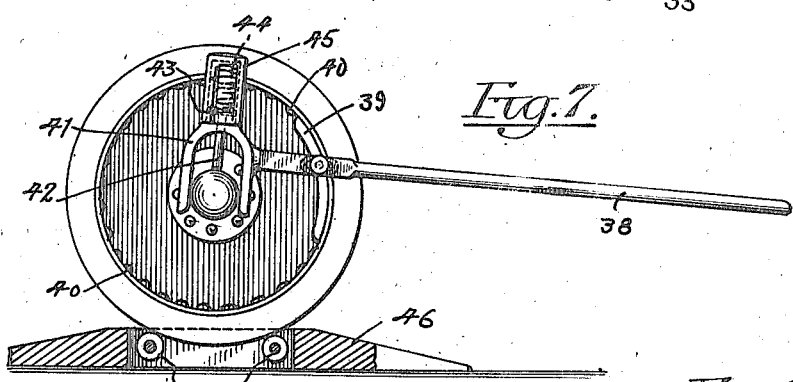
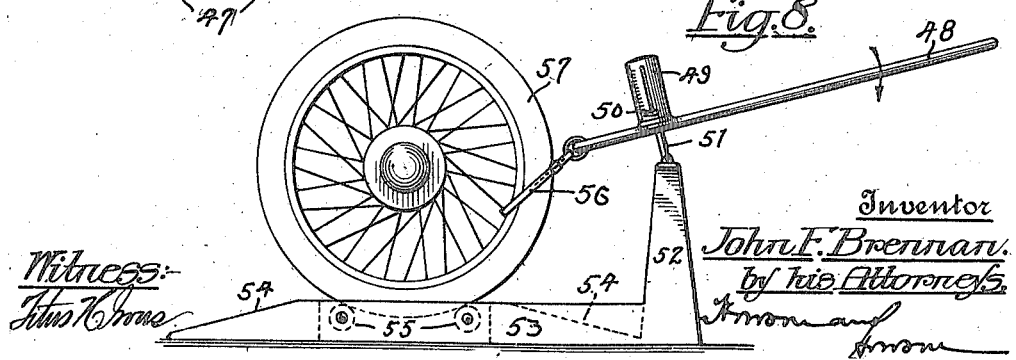
Inventor
John F. Brennan.
by his Attorneys.

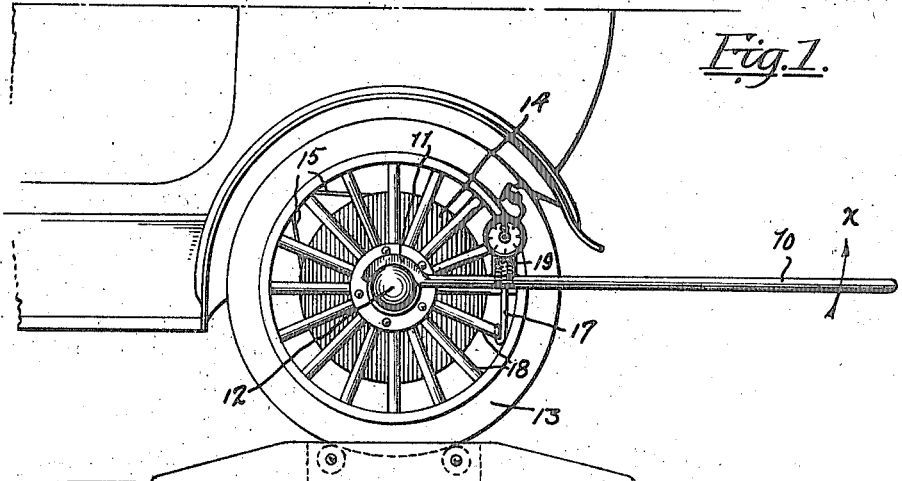
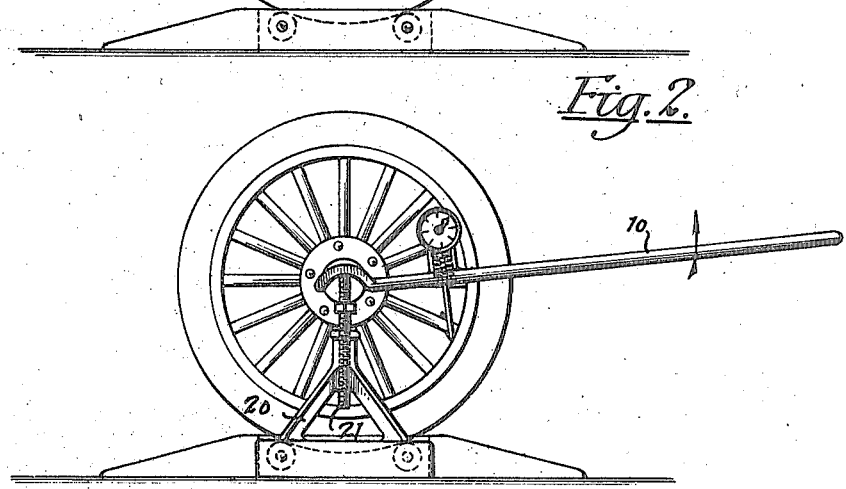
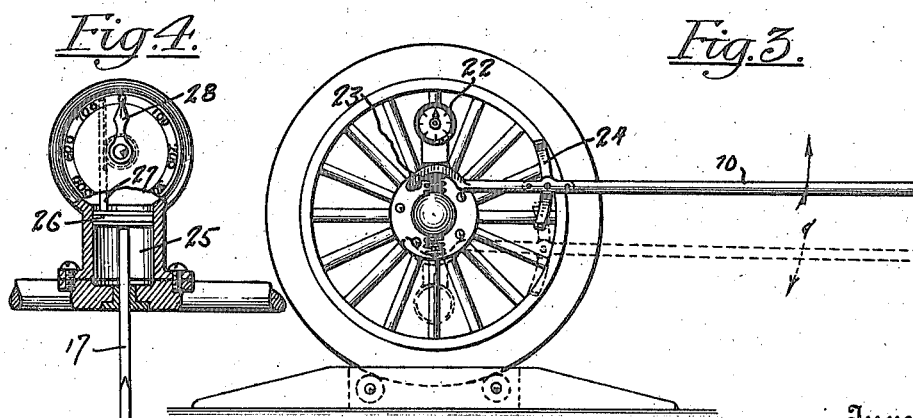

UNITED STATES PATENT OFFICE.

JOHN F. BRENNAN, OF NEW YORK, N. Y.

BRAKE-TESTER.

1,264,770.

Specification of Letters Patent.

Patented Apr. 30, 1918.

Application filed April 24, 1916. Serial No. 93,164.

*To all whom it may concern:*

Be it known that I, JOHN F. BRENNAN, a citizen of the United States of America, and residing in the borough of the Bronx, in the city, county, and State of New York, have invented a certain new and useful Improvement in Brake-Testers, of which the following is a specification.

My invention relates to a brake testing appliance particularly designed for testing the brakes of an automobile, and the object of my invention is to provide a simple and inexpensive device for this purpose which may be readily applied either in a garage or elsewhere to determine whether or not the brakes are in proper working condition.

In the accompanying drawings,

Figure 1 is a side elevation of my device in one form applied to the wheel of an automobile;

Fig. 2 is a similar view showing a modified arrangement;

Fig. 3 is a similar view showing a further modification;

Fig. 4 is an enlarged broken section of the gage element;

Fig. 5 is a side elevation of a further modification of the testing device;

Fig. 6 is a plan of the latter;

Fig. 7 is a side elevation of a still further modification; and

Fig. 8 is a similar view of another modification.

With the increasing urban use of automobiles both for passenger and for freight carriage, the dangers resulting from imperfect function of the brakes, become very great. It is desirable and has in fact been proposed that inspectors be provided in congested districts whose duty it should be to observe the cars and report or arrest those which have defective brakes. The only means which are at present available for testing the brakes of the cars is the rather crude one of driving the car and then applying the brakes to determine within what space the car can be halted. This is a deficient test since the personal equation enters largely into the operation and the same car tested by different persons would operate in different ways. It is quite desirable that some standard accurate device be provided for this purpose which may be applied promptly and easily to a car which appears to have defective brakes, for the purpose of determining whether or not at the time of observation it is the fault of the brakes or the fault of the operator. It is particularly desirable that a portable device be provided for instant test use, since a car may behave quite differently when taken stagnant in a garage, from the manner in which it behaves after it has been driven for a while and the parts are in the condition which they thus normally assume during the operation of the car.

In the form shown in Fig. 1 the present device comprises a lever 10 arched at one end 11 to rest upon the hub 12 of the wheel 13, controlled by the brake drum 14 through the brake band 15. Mounted at a suitable point on the lever 10 is a recorder 16 of any suitable construction, the operating mechanism of which is connected in any suitable way with a hook 17 free of the lever 10 and adapted to engage one of the spokes 18 of the wheel. A spring 19 or other suitable yielding means of predetermined strength is operatively interposed between the hook 17 and the lever 10. In operation the end 11 of the lever 10 is rested on the wheel hub 12 as a fulcrum and the hook 17 engaged with one of the spokes 18, in the manner shown. After the wheel is clear of the ground and the brake 15 has been applied, the free end of the lever 10 is lifted in the direction of the arrow $x$ tending to turn the wheel. The power which it is necessary to apply in order to overcome the resistance of the brake is registered by the recorder 16 and thus indicates the capacity of the brake.

In Fig. 2 the same lever and recording device are shown but the lever end 11 instead of being supported upon the wheel hub bears against an independent fulcrum pedestal 20. The stem 21 upon which the end 11 of the lever rests is adjustable in height to insure the location of the lever end at the axis of the wheel. This pedestal would not be necessary ordinarily except when the wheel hub is non-circular.

In the construction shown in Fig. 3 the gage 22 is mounted on the fulcrum end 11 of the lever and the gage spring 23 bears against the hub 12 of the wheel. In this modification I have shown the engagement between the lever 10 and the wheel spoke accomplished by means of a double hook 24. It is obvious gage 22 records in precisely the same way the effort exerted to turn the wheel, since the effort is transmitted to the spring 23 at the hub just as it is taken by the spring 19 in the gage pedestal from the hook 17 in the form shown in Figs. 1 and 2.

Instead of a spring, as in the forms shown, I may use a pneumatic pressure chamber 25, as shown in Fig. 4. In this case the pull on the hook 17 serves to compress the air in the chamber 25 and the extent of the compression of course, before the wheel slips its brake, determines the position of the plunger 26 and thus, through the rod 27, controls the position of the dial hand 28.

In Figs. 5 and 6 I have shown another form more particularly applicable to heavy trucks. The wheel to be tested is run up the end incline of a supporting block 29 and positioned upon a roller-bearing plate 30 carried by the block. The testing lever 31 is pivoted at 32 to the body of the block 29 and carries the gage 33. The stem 34 of the gage is secured to the outer end 35 of a second lever, the opposite end of which is pivotally connected at 36 to the roller plate 30. On the upward movement of the testing lever 31 its tendency is to pull the plate 30 in the direction indicated by the arrow $y$. This however, is opposed by the wheel brake and the strength of the opposition is registered on the dial 33. In order to prevent the slip of the plate beneath the wheel rim its surface is preferably corrugated as at 37.

In Fig. 7 the testing lever 38 carries a shoe 39 which may be engaged with rivet heads or the like 40 on the inner face of the wheel rim to establish an operating connection therewith. This is particularly valuable for wheels of the solid type which have no spokes, but which invariably have studs of some sort projecting on the inner face of the rim. In this modification, the fulcrum end of the lever comprises a fork 41 which straddles the wheel hub, while a stem 42 bears upon the hub and actuates the sliding pointer 43 against the action of the gage spring 44 confined within the upper portion of the cylindrical body 45 of the gage. In this construction the wheel under test is run up the incline 46 and rests upon rollers 47. This appliance, viz., 46 and 47, is preferably used with all of the testing levers where possible, since it is an extremely simple device for lifting the wheel out of frictional contact with the ground. Of course a jack may be used, if preferred, but is ordinarily insufficiently stable for the purpose of such a test.

In Fig. 8 the testing lever 48 carries a gage body 49 of the type shown in Fig. 7, provided with a pointer 50 on the stem 51. The lever is pivoted, through the stem 51, upon a pedestal 52 rigid with the stand 53 having double inclines 54 and supporting rollers 55, as in the form just shown. The operative connection between the testing lever and the wheel is secured by means of a chain or strap 56 fast at one end to the lever and adapted to be passed between spokes of the wheel 57. Here the wheel 57 has wire spokes which might be bent or otherwise injured by the use of a hook such as is shown in Figs. 1 to 3.

While I have so far mentioned the rotation of the wheel in only one direction against the action of its brake, it is obvious that the test may be made more thorough by rotating the wheel in both directions. This may be accomplished by a mere reversal of the lever to the opposite side of the wheel, or by placing the fulcrum beneath instead of above the wheel hub and pressing down instead of up. The latter position is shown in dotted lines in Fig. 3.

It is furthermore obvious that although the invention has been described and designed by me for use in connection with automobile wheels, it may be used for testing a wagon wheel brake of any sort and perhaps other devices as well.

The constructions shown are merely illustrative embodiments of my invention and may be variously modified without departing from what I claim as my invention.

I claim as my invention:—

1. A brake tester comprising means engaging a wheel element for rotating a wheel against the action of its brake and means associated therewith for indicating the resistance of the brake, together with means for temporarily supporting the wheel during the operation of said brake tester.

2. A brake tester comprising portable means engaging a wheel element for rotating a wheel against the action of its brake and means associated therewith for indicating the resistance of the brake, together with means for temporarily supporting the wheel during the operation of said brake tester.

3. A brake tester comprising manually operable means engaging a wheel element for rotating a wheel against the action of its brake and means associated therewith for indicating the resistance of the brake, together with means for temporarily supporting the wheel during the operation of said brake tester.

4. A brake tester comprising a testing lever for turning a wheel against the action of its brake, means associated with said lever to engage the wheel and means carried by the lever for indicating the resistance of the brake to the turning effort exerted upon the lever, together with means for temporarily supporting the wheel during the operation of said brake tester.

5. A brake tester comprising a testing lever for turning a wheel against the action of its brake, means associated with said lever to engage the wheel and means responsive to the turning effort to indicate the resistance of the brake thereto, together with means for temporarily supporting the wheel during the operation of said brake tester.

6. A brake tester comprising a lever, means associated with said lever for rotating a temporarily supported wheel, together with a gage having a fixed portion connected to said lever and a relatively displaceable portion subject to the stress incident to the rotation of the wheel.

7. A brake tester comprising a lever, means associated therewith for engaging a peripheral portion of a wheel to rotate the same, together with a gage responsive to the turning effort to indicate the resistance of the brake thereto.

8. A brake tester comprising a lever pivoting substantially at the wheel axis, means carried thereby for engaging a peripheral portion of the wheel to rotate the same, together with a gage responsive to the turning effort to indicate the resistance of the brake thereto.

9. A brake tester comprising a lever pivoting on the wheel hub, means carried thereby for engaging a peripheral portion of the wheel to rotate the same, together with a gage responsive to the turning effort to indicate the resistance of the brake thereto.

In testimony whereof I have signed my name to this specification in the presence of a subscribing witness.

JOHN F. BRENNAN.

Witness:
  WALTER ABBE.